US011472110B2

(12) United States Patent
Fockele et al.

(10) Patent No.: US 11,472,110 B2
(45) Date of Patent: Oct. 18, 2022

(54) FACILITY FOR THE MANUFACTURE OF OBJECTS FROM MATERIAL POWDER WITH PROVISION OF THE POWDER IN LINE FORM

(71) Applicant: REALIZER GMBH, Borchen (DE)

(72) Inventors: Matthias Fockele, Borchen (DE); Daniel Golz, Langenberg (DE)

(73) Assignee: REALIZER GMBH, Borchen (DE)

( * ) Notice: Subject to any disclaimer, the term of this patent is extended or adjusted under 35 U.S.C. 154(b) by 0 days.

(21) Appl. No.: 16/341,477

(22) PCT Filed: Sep. 26, 2017

(86) PCT No.: PCT/EP2017/074345
§ 371 (c)(1),
(2) Date: Aug. 16, 2019

(87) PCT Pub. No.: WO2018/069036
PCT Pub. Date: Apr. 19, 2018

(65) Prior Publication Data
US 2019/0375157 A1 Dec. 12, 2019

(30) Foreign Application Priority Data
Oct. 12, 2016 (DE) ............... 20 2016 006 355.4

(51) Int. Cl.
*B29C 64/343* (2017.01)
*B33Y 30/00* (2015.01)
(Continued)

(52) U.S. Cl.
CPC ............ *B29C 64/343* (2017.08); *B29C 64/20* (2017.08); *B33Y 30/00* (2014.12); *B33Y 40/00* (2014.12)

(58) Field of Classification Search
CPC ...... B29C 64/343; B29C 64/20; B29C 64/205; B33Y 30/00; B33Y 40/00
See application file for complete search history.

(56) References Cited

U.S. PATENT DOCUMENTS 6,007,318 A * 12/1999 Russell ............... B33Y 30/00
425/130
6,217,816 B1 * 4/2001 Tang .................. B28B 11/243
264/497

(Continued)

FOREIGN PATENT DOCUMENTS

| CN | 102015258 A | 4/2011 |
| CN | 104742236 A | 7/2015 |

(Continued)

OTHER PUBLICATIONS

"Translation." Aug. 28, 2016. Merriam-Webster.com Dictionary, Merriam-Webster, https://www.merriam-webster.com/dictionary/translation. Accessed Dec. 22, 2020. (Year: 2016).*

(Continued)

*Primary Examiner* — Joseph S Del Sole
*Assistant Examiner* — Margaret B Hayes
(74) *Attorney, Agent, or Firm* — Kilpatrick Townsend & Stockton LLP

(57) ABSTRACT

The invention relates to a facility (1) for the manufacture of three-dimensional objects from material powder, through layerwise consolidation of said material powder present on a process surface (42) in such places of the particular layer (40) that correspond, in accordance with geometrical data, to the object about to be manufactured, wherein the facility (1) comprises a process floor (46) surrounding the process surface and a powder feed device (10) to feed, provide and distribute the powder on the process surface (42), wherein the powder feed device (10) comprises: a conveying element (12) for feeding powder into the powder feed device (10), a (Continued)

reservoir (14), into which the at least one conveying element (12) feeds the powder, a process conveying element (16), which can act on powder in the reservoir (14), in order to provide this in dosed quantity on the process floor (46) adjacent to the process surface (42), a process pusher (18) for distributing the powder provided adjacent to the process surface (42) over the process surface (42), wherein the process conveying element (16) is designed, such that the powder adjacent to the process surface (42) can be provided in the form of a line.

13 Claims, 2 Drawing Sheets

(51) Int. Cl.
*B33Y 40/00* (2020.01)
*B29C 64/20* (2017.01)

(56) References Cited

U.S. PATENT DOCUMENTS

| | | | | |
|---|---|---|---|---|
| 8,017,055 | B2 * | 9/2011 | Davidson | B29C 41/12 |
| | | | | 264/308 |
| 2008/0134965 | A1 | 6/2008 | Perret et al. | |
| 2010/0272519 | A1 * | 10/2010 | Ederer | B29C 64/357 |
| | | | | 406/154 |
| 2015/0224712 | A1 * | 8/2015 | Tjellesen | B29C 64/295 |
| | | | | 425/375 |
| 2017/0072636 | A1 * | 3/2017 | Ng | B29C 64/241 |
| 2017/0252975 | A1 * | 9/2017 | Park | B33Y 30/00 |
| 2018/0099458 | A1 * | 4/2018 | Crear | B33Y 30/00 |
| 2018/0281284 | A1 * | 10/2018 | Elgar | B29C 64/364 |
| 2019/0001413 | A1 * | 1/2019 | Golz | B29C 64/153 |

FOREIGN PATENT DOCUMENTS

| | | | | |
|---|---|---|---|---|
| CN | 105345002 | A | 2/2016 | |
| DE | 102008022495 | | 11/2009 | |
| EP | 2281677 | | 2/2011 | |
| EP | 2286982 | A1 | 2/2011 | |
| GB | 2568518 | A * | 5/2019 | ........... B29C 64/245 |
| JP | 2003245981 | A | 9/2003 | |
| JP | 2008126672 | A | 6/2008 | |
| JP | 2009279928 | A | 12/2009 | |
| WO | 2016151783 | A1 | 9/2016 | |

OTHER PUBLICATIONS

"To-and-fro." Nov. 30, 2013. Merriam-Webster.com Dictionary, Merriam-Webster, https://www.merriam-webster.com/dictionary/to-and-fro. Accessed Dec. 22, 2020. (Year: 2013).*

"Provide." Dec. 22, 2020. Merriam-Webster.com Dictionary, Merriam-Webster, https://www.merriam-webster.com/dictionary/provide. Accessed Dec. 22, 2020. (Year: 2020).*

"Push." Dec. 22, 2020. Merriam-Webster.com Dictionary, Merriam-Webster, https://www.merriam-webster.com/dictionary/push. Accessed Dec. 22, 2020. (Year: 2020).*

International Application No. PCT/EP2017/074345, International Written Opinion and Search Report, dated Dec. 15, 2017.

International Application No. PCT/EP2017/074345, International Preliminary Report on Patentability with Annex, dated Sep. 28, 2018.

Chinese Application No. CN201780074949.8, Office Action, dated Jan. 28, 2021, 9 pages.

Japanese Application No. JP2019519662, Office Action, dated Jul. 6, 2021, 8 pages.

* cited by examiner

FACILITY FOR THE MANUFACTURE OF OBJECTS FROM MATERIAL POWDER WITH PROVISION OF THE POWDER IN LINE FORM

The invention relates to a facility for the manufacture of three-dimensional objects from material powder, through layerwise consolidation of said material powder present on a process surface in such places of the particular layer that correspond, in accordance with geometrical data, to the object about to be manufactured, wherein the facility comprises a process floor surrounding the process surface and a powder feed device to feed, provide and distribute the powder on the process surface, wherein the powder feed device comprises:

- a conveying element for feeding powder into the powder feed device;
    - a reservoir, into which the at least one conveying element feeds the powder;
    - a process conveying element, which can act on powder in the reservoir, in order to provide this in dosed quantity on the process floor adjacent to the process surface; and
    - a process pusher for distributing the powder provided adjacent to the process surface over the process surface.

With such a facility the manufacturing process usually proceeds through repetition of the following steps:

- moving of the process surface to a suitable height in relation to the surrounding process floor with regard to the powder used;
- provision of a quantity of powder adjacent to the process surface (this can also happen simultaneously or also before the previously mentioned step);
- uniform distribution of the powder onto or over the process surface by means of a process pusher or another corresponding tool;
- consolidation of corresponding regions of the powder distributed on the process surface, for example through laser melting;
- optionally removal of excess and non-consolidated powder; and
- moving of the process surface again and provision of further powder.

For the quality of the thus manufactured object it is essential that the desired quantity of powder is consolidated as accurately as possible in each layer, as accurately as possible in the desired place, so that the object can be manufactured with the desired geometry in accordance with the geometrical data and with a desired solid-body microstructure that is more particularly as homogeneous as possible.

However for this a distribution of the powder on the process surface that is as uniform as possible is advantageous. Thus the uniform distribution of the powder is very important for the precise manufacture of a desired object.

In existing systems however this uniform distribution of the powder is not always present. For example in a well-known type of facility the powder is provided in a heap and then distributed over the process surface by a rotary pusher or linearly movable pusher. However this does not always lead to an acceptable uniformity of powder distribution.

The object of the present invention is therefore to provide a facility, in which a more uniform distribution of powder is achieved than in the prior art.

This object is achieved by means of a facility with the features of claim 1. Advantageous embodiments are subject-matter of the dependent claims.

According to the invention it is proposed that the powder be provided on or beside the process surface or adjacent to the process surface in the form of a line. In comparison with the previously known provision of the powder this offers considerable advantages with regard to a uniform subsequent distribution of the powder, as the powder is thus no longer concentrated in a single small region in relation to the reach of the pusher, as a result of which a non-uniform thickness of the powder layer in the corresponding region coated by the pusher is prevented.

For this, preferably, the process conveying element, which provides the powder adjacent to the process surface, is configured with an oblong pushing surface, which can be pushed to and fro in one direction.

With that powder is pushed away directly out of the reservoir, such that the powder is disposed essentially or completely in the form of a line adjacent to the process surface according to the form of the oblong pushing surface.

Preferably the line is straight or e.g. curved concavely. This is preferred, as the process surface is usually configured in the form of a simple geometry, for example square, rectangular or circular. Through matching of the line form to the form of the process surface the appropriate quantity of powder to be distributed along a spatial direction of the process surface can be provided much more easily for each section of the process surface.

With correspondingly different forms of the process surface a correspondingly different line form might also have to be chosen. At the same time with certain forms of the process surface, for example already with a circular process surface, it can be advantageous, if the powder line provided is not in all places equally thick or equally wide or does not have the same amount of powder per unit of length, as in projection of the process surface to the powder line in certain regions there is more process surface to a certain line section, as a result of which more process surface needs to be coated from these sections. For this an increased quantity of powder in the corresponding regions of the line can be advantageous.

Preferably the process pusher distributes the provided powder by means of translational movements over the process surface, more particularly only by means of translational movements in one direction and translational movements in the opposite direction. In comparison with the rotational movements of the existing pushers translational movements in combination with the provision of the powder in line form offer a particularly uniform movement and uniform powder distribution, which, owing to the line form, also reaches all regions of the process surface.

In other exemplary embodiments of the invention the provided powder can also be distributed with rotating or pivoting pushers.

The process pusher is preferably controllably height-adjustable in relation to the process floor, so that one time a lower end of the process pusher touches the process floor or comes very close to it (e.g. less than the thickness of a grain of powder) and so that one time the lower end is spaced apart from the process floor (preferably more than the maximum height of the powder provided in the form of a line).

This allows the process pusher to be held one time close to or in contact with the process floor, such that the process pusher, when displaced, essentially takes the entire powder of the provided line with it. On the other hand the process pusher, after a movement over to the other side of the process surface, can be lifted up away from this and/or a newly provided powder line, in order to displace powder again in the same movement.

The reservoir is preferably configured oblong, more particularly corresponding to the aforementioned oblong pushing surface. Beyond that the conveying element ends preferably at a reservoir conveying element, which is disposed partly in or adjacent to the reservoir, in order to distribute the fed-in powder along the reservoir.

Thus, through the distribution of the powder in the reservoir, the provision in the form of a line is already prepared in part. More particularly in the embodiment with process conveying element comprising an oblong pushing surface which can be pushed to and fro in one direction the provision of the powder in the form of a line is already achieved through simple to-and-fro movement of the pushing surface from the reservoir to the process floor.

In this connection the reservoir conveying element preferably comprises a screw conveyor, which runs along the reservoir.

Preferably, more particularly in the embodiment as or with screw conveyor, the reservoir conveying element can be operated in two ways, which bring about conveyance of the powder in opposite conveying directions. This is advantageous, as the conveying element can then merge centrally in relation to the reservoir, as a result of which a uniform distribution of the powder in the reservoir is guaranteed more easily, which in turn promotes a more uniform distribution of the powder along the provided powder line. A merging of the conveying element neither centrally nor at the edge of the reservoir is thus also possible.

Particularly preferably this can be realised in the configuration of the reservoir conveying element as screw conveyor, which can be driven one time anticlockwise and one time clockwise, as a result of which the powder is conveyed respectively in the one direction along the screw conveyor and in the corresponding opposite direction, wherein it is presupposed in this connection, that the screw has a uniform screw flight throughout. This can also be achieved easily in technical terms by means of an electric motor or similar, though it can also come about alternatively by means of other drives that are suitable for driving the reservoir conveying element or the screw conveyor selectively in both rotational directions.

Alternatively the reservoir conveying element can also be configured with differently conveying regions, one region of which conveys powder in the one direction alongside the reservoir and the other region in the opposite direction. Both regions are then adjacent to one another in the region of the conveying element merging into the reservoir, such that the powder is distributed in the entire reservoir. In this connection a central merging of the conveying element in relation to the reservoir is likewise possible. A merging of the conveying element neither centrally nor at the edge of the reservoir is thus also possible.

In the configuration with screw conveyor this can be realised by the screw not having a uniform screw flight throughout, but having one region with screw flight with rotation in one direction and one region with rotation in the other direction, Preferably the process conveying element works from below in relation to the process floor, i.e. that the reservoir lies below the process floor and the process floor has a corresponding oblong slit-like opening towards the reservoir. Through movement of the process conveying element from the reservoir into this opening the powder is then provided directly in line form adjacent to the process surface.

This comes about particularly advantageously, if the process conveying element is configured with the oblong pushing surface on the top side and is moved so far that the pushing surface is essentially flush with and at the same height as the process floor.

Preferably the process conveying element is matched to the opening, such that no quantities of powder worth mentioning can get between the top side of the process conveying element and the inside walls of the openings. This ensures that a defined quantity of powder per unit of length of the process conveying element is provided for the powder line.

Preferably the process conveying element is configured as a kind of block-shaped reciprocating-piston element, which can be lifted and lowered by way of a control system. That means that an oblong piston head is provided, on the top side of which the pushing surface is configured correspondingly and which corresponds approximately to the length of the slit-like opening from the last extension and also to the form, such that during its stroke movements it can convey a line-shaped quantity of powder out of the reservoir onto the desired level just above the process floor.

Generally the reservoir is disposed preferably below the process floor and in top view to the side of the process surface.

Because powder materials that require a protective atmosphere are generally used, the process floor and process surface are generally configured as underside or floor of a process chamber, which, with a view to maintaining the protective atmosphere, correspondingly has walls, ceiling and openings for the feeding-in or removal of corresponding gases and/or other elements and/or items required for the process in an air-tight manner.

Preferably the process surface is supported by the head of a corresponding object piston.

With regard to the present invention the term "line-shaped" or "in the form of a line" is to be understood more particularly, such that a powder line or line-shaped provision of powder or powder provided in the form of a line is a collection of powder that is continuous and has one width in each section and all sections of the powder line together form a continuous sequence and thereby define a length, wherein the length is considerably greater than the width, more particularly at least ten times as great. Such a powder line is also to be understood, such that a certain height is present in each section, more particularly in relation to the process floor, and this height is likewise very small in comparison with the length, preferably smaller by a factor of at least 10.

In relation to the invention the wording "essentially" is to be understood in relation to length, height or other spatial coordinates, such that essentially equally extended regions differ in their extension in a dimension which, from the order of magnitude, corresponds to the average grain size or less, preferably more particularly less than 100 grain sizes.

An adjacent disposition of the powder to the process surface is to be understood in this connection to denote both that there may be a certain spacing between the powder and the process surface and also that there is no longer any spacing between powder and process surface and possibly some of the powder is already on the process surface.

The invention is explained below with the help of an exemplary embodiment shown in the figures, wherein the invention is not limited to this exemplary embodiment.

Figure 1:
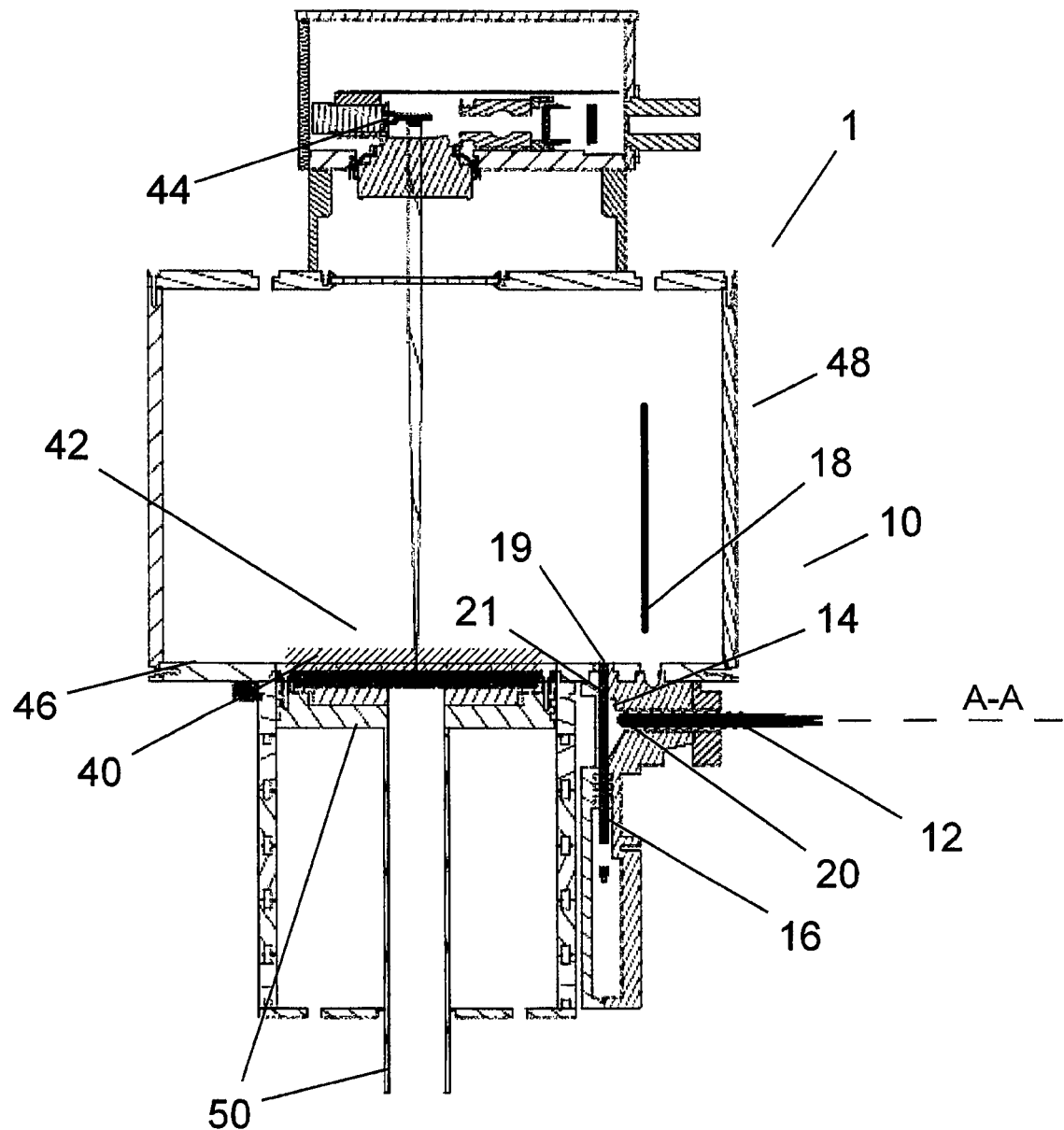
FIG. 1 shows a vertical section through a facility according to the invention for the manufacture of three-dimensional objects according to an exemplary embodiment of the invention.

As shown in FIG. 1, a facility 1 according to the invention for the manufacture of three-dimensional objects from material powder comprises a process surface 42, on which a powder layer 40 can be disposed, whereupon some regions of this powder layer 40 can be consolidated for example by means of laser 44. In this connection the process surface 42 is above and in alignment with the top side of a process piston 50, which moves down correspondingly after working of a powder layer 40, so that the next powder layer 40 can be applied and the subsequent consolidation can take place.

In this connection adjacent to the process surface 42 and surrounding the same is disposed the process floor 46, which together with the process surface 40 forms the floor of a process chamber 48.

After each consolidation operation and moving-down of the process piston 50 a new powder layer 40 must be applied. This takes place according to the invention by a process conveying element 16, which has an oblong pushing surface 19 on the top side, being moved from below through a reservoir filled entirely or in part with powder, until the pushing surface 19 of the process conveying element 16 is more or less flush with the process floor 46.

Because the pushing surface 19 of the process conveying element 16 is configured in the manner of a line, after each relevant stroke movement the powder is thus also provided in the form of a line, corresponding to the geometry shown, disposed adjacent to the process surface 42.

In this connection the process conveying element 16 of a powder feed device 10 moves into a slit-like opening 21, which is configured between the reservoir 14 of the powder feed device 10 and the process floor 46. After the powder has been provided adjacent to the process surface 42 in the form of a line, a process pusher 18 is moved to such an extent, that it makes contact with the process floor 46 and is then moved translationally over the process surface 42, so it takes the powder line with it and distributes it over the process surface 42. The process pusher 18 can then be moved back, again translationally, at the same height over the process surface 42 for further distribution of the powder or it can be moved again correspondingly upwards, in order to return to its starting position without contact with the process surface 42 or the powder distributed thereon.

According to an alternative embodiment the process pusher 18 can also be configured to be movable in respect of height by means of a control system in such a way that, shortly before its reversal point in its forward and backward movement, it can be raised above a remainder of powder pushed forward by it, in order to take said remainder of powder with it again during its return movement and to distribute it on the process surface 42.

In order to keep the reservoir 14 filled with sufficient powder, a conveying element 12, which is configured as screw conveyor, merges into the reservoir 14. Whenever there is insufficient powder in the reservoir 14, the conveying element 12 is operated accordingly.

In this connection of course, owing to the desired protective-gas atmosphere, corresponding sealing means are located in all critical places, where protective gas could escape or indoor-air atmosphere could enter.

Figure 2:
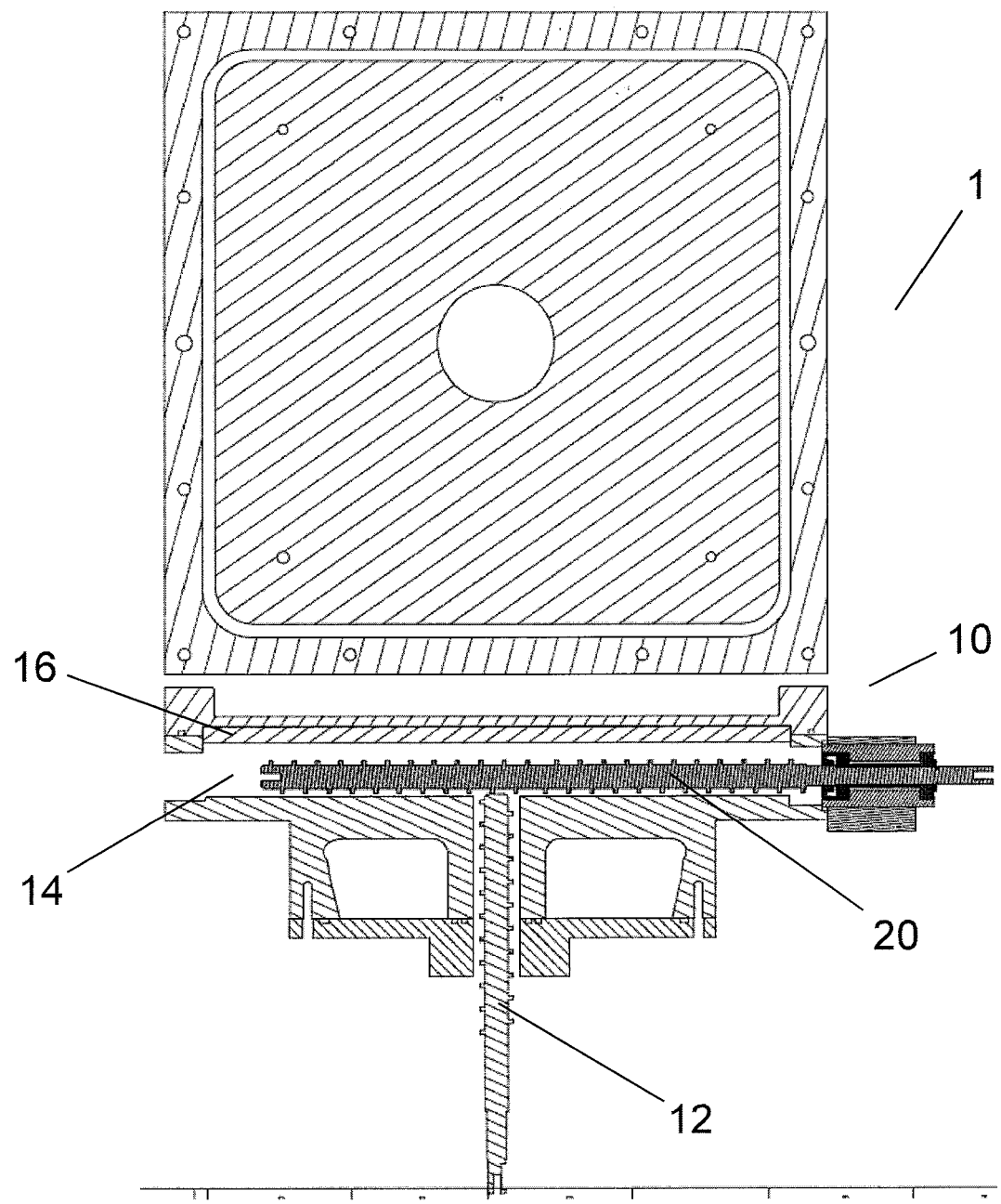
FIG. 2 shows a horizontal section through the facility shown in FIG. 1 at the height of the dashed line A-A.

As shown in FIG. 2, the reservoir 14 and the process conveying element 16 and its top side with the pushing surface 19 are configured oblong. Along the reservoir 14 there extends a reservoir conveying element 20, which is likewise configured as screw conveyor. Because the conveying element 12 merges into the reservoir 14 and the reservoir conveying element 20 has no wall towards the remaining reservoir 14, the reservoir conveying element 20 can displace and distribute the powder 14 present in the reservoir along the longitudinal direction of the reservoir 14.

In order for a uniform distribution of the powder in the reservoir 14 to be achieved more effectively, the reservoir conveying element 20 or the screw conveyor 20 is connected with a motor (not indicated), which can be operated in both directions. Thus, in relation to FIG. 2, the reservoir conveying element 20 can convey powder in the reservoir 14 both from right to left and also from left to right.

Alternatively the screw conveyor 20 can also be configured, such that it does not have a uniform screw flight throughout, but the rotation changes approximately at the merging of the conveying element 12 into the reservoir. Thus upon turning of the screw conveyor 20 the powder is distributed in both direction along the reservoir 14.

As a result of this it is possible in both cases that the conveying element 12 or the screw conveyor 12 ends practically centrally in relation to the oblong reservoir 14 or its longitudinal direction. This likewise makes a uniform distribution of the powder in the reservoir 14 easier.

The invention claimed is:

1. A system for manufacturing three-dimensional objects from material powder, through layerwise consolidation of said material powder present on a process surface in such places of a particular layer that corresponds, in accordance with geometrical data, to an object about to be manufactured, wherein the system comprises a process floor surrounding the process surface and a powder feed device to feed, provide, and distribute the powder on the process surface, wherein the powder feed device comprises:

a conveying element for feeding powder into the powder feed device;

a reservoir, into which the conveying element feeds the powder;

a process conveying element, which acts on the powder in the reservoir, to provide the powder in a dosed quantity on the process floor adjacent to the process surface, wherein the process conveying element is designed such that the dosed quantity of the powder on the process floor adjacent to the process surface can be provided in a form of a line, wherein the process conveying element comprises an oblong pushing surface and acts on the powder in the reservoir with the oblong pushing surface via at least a first movement in a first direction from the reservoir to the process floor and a second movement in a second direction opposite the first direction, wherein the process conveying element is configured as a T-shaped reciprocating-piston element; and a process pusher for distributing the dosed quantity of the powder provided adjacent to the process surface over the process surface.

2. The system of claim 1, wherein the powder is pushed out of the reservoir using the oblong pushing surface, such that the powder is disposed in the form of the line adjacent to the process surface according to the form of the oblong pushing surface.

3. The system of claim 1, wherein the reservoir is configured oblong and the conveying element ends at a reservoir conveying element, which is disposed partly in or adjacent to the reservoir, in order to distribute the powder along the reservoir and that the reservoir conveying element is operated in two ways, which bring about conveyance of the powder in opposite conveying directions or conveys the powder simultaneously in two opposite directions.

4. The system of claim 3, wherein the reservoir conveying element comprises a screw conveyor that runs along the reservoir a screw conveyor with no uniform screw flight throughout but with a region with rotation in one direction and a region with the rotation in a direction opposite the one direction, or a combination thereof.

5. The system of claim 4, wherein the reservoir conveying element further comprises a drive configured to drive in both rotational directions, a screw conveyor with no uniform screw flight throughout but with a region with rotation in one direction and a region with rotation opposite the one direction, or a combination thereof.

6. The system of claim 1, wherein the line is straight or curved concavely.

7. The system of claim 1, wherein the process pusher distributes the powder using translational movements over the process surface.

8. The system of claim 1, wherein the process pusher is adjustable in relation to the process floor such that at a first time a lower end of the process pusher touches the process floor at a second time the lower end is spaced apart from the process floor.

9. The system of claim 1, wherein the conveying element comprises a screw conveyor or is a screw conveyor.

10. The system of claim 1, wherein an oblong slit-like opening as far as the reservoir is configured in the process floor for movement of the powder adjacent to the process surface by means of insertion of the process conveying element into the oblong slit-like opening.

11. The system of claim 10, wherein the oblong slit-like opening and the process conveying element are matched together in a form-fitting or sealing manner, such that powder with a usual grain size cannot get between a side wall of the process conveying element and an inside wall of the oblong slit-like opening.

12. The system of claim 1, wherein the reservoir is disposed below the process floor and in top view to a side of the process surface.

13. The system of claim 1, wherein the process pusher distributes the powder only using translational movements over the process surface in one direction and translational movements over the process surface in the opposite direction.

* * * * *